US008281115B2

United States Patent
Choi et al.

(10) Patent No.: US 8,281,115 B2
(45) Date of Patent: Oct. 2, 2012

(54) SECURITY METHOD USING SELF-GENERATED ENCRYPTION KEY, AND SECURITY APPARATUS USING THE SAME

(75) Inventors: Yun-ho Choi, Gangnam-gu (KR); Cheul-hee Hahm, Seongnam-si (KR); Chang-yong Heo, Gangnam-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1139 days.

(21) Appl. No.: 11/730,473

(22) Filed: Apr. 2, 2007

(65) Prior Publication Data

US 2008/0025503 A1   Jan. 31, 2008

(30) Foreign Application Priority Data

Jul. 27, 2006   (KR) .................. 10-2006-0070707

(51) Int. Cl.
G06F 15/177 (2006.01)
(52) U.S. Cl. .............. 713/2; 713/171; 713/193; 726/30; 726/31
(58) Field of Classification Search ............. 713/2, 171, 713/193; 726/30, 31; 705/57; 72/30, 31
See application file for complete search history.

(56) References Cited

U.S. PATENT DOCUMENTS

| | | | |
|---|---|---|---|
| 6,785,390 B1 * | 8/2004 | Hiraide | 380/262 |
| 7,294,056 B2 * | 11/2007 | Lowell et al. | 463/17 |
| 7,529,919 B2 * | 5/2009 | Lampson et al. | 713/1 |
| 7,590,865 B2 * | 9/2009 | Han et al. | 713/189 |
| 7,610,477 B2 * | 10/2009 | Holladay et al. | 713/1 |
| 2005/0071677 A1 * | 3/2005 | Khanna et al. | 713/201 |
| 2005/0144466 A1 * | 6/2005 | Versteijlen et al. | 713/189 |

FOREIGN PATENT DOCUMENTS

KR   10-2004-0099404 A   11/2004
WO   03/085479 A2   10/2003

* cited by examiner

Primary Examiner — Eleni Shiferaw
Assistant Examiner — Paul Callahan
(74) Attorney, Agent, or Firm — Sughrue Mion, PLLC

(57) ABSTRACT

A security method and a security apparatus are disclosed which use a self-generated encryption key. The security method includes the steps of: generating an encryption key; decrypting pre-encrypted data using a pre-stored manufacturer key; and re-encrypting the decrypted data using the encryption key. The security method and apparatus minimize external leakage of data by self-generating the unique encryption key. Since the encryption keys are unique in each set, set binding is possible.

24 Claims, 3 Drawing Sheets

SECURITY METHOD USING SELF-GENERATED ENCRYPTION KEY, AND SECURITY APPARATUS USING THE SAME

CROSS-REFERENCE TO RELATED APPLICATIONS

This application claims priority from Korean Patent Application No. 10-2006-0070707, filed Jul. 27, 2006, in the Korean Intellectual Property Office, the entire contents of which is incorporated herein by reference.

BACKGROUND OF THE INVENTION

1. Field of the Invention

Methods and apparatuses consistent with the present invention relate to security using a self-generated encryption key, and more particularly, to a security method which can prevent leakage and the altering of confidential data by using a self-generated encryption key, and a security apparatus using the same.

2. Description of the Related Art

Recently, multimedia systems, such as home servers, need a security apparatus for improving security. Such a security apparatus must boot operating system (OS) images recorded on a nonvolatile storing medium in the system without any alteration thereof, and must prevent leakage and alteration of confidential data, such as an important application and an execution key for executing the important application.

To protect confidential data, related art security apparatuses store the pre-encrypted confidential data in a nonvolatile storing medium, and store a decryption key and an authentication program for checking the integrity of the OS images in an internal storing medium which rejects external access.

FIG. 1 is a block diagram illustrating a related art security apparatus. Referring to FIG. 1, the related art security apparatus includes a security unit 110, a global bus 120, a nonvolatile memory 130 and a central processing unit 140.

The security unit 110 protects confidential data, and includes a reduced instruction set computing (RISC) processor 112, and a one time programmable (OTP) memory 114.

In order to use the confidential data, the RISC processor 112 decrypts the encrypted confidential data stored in the nonvolatile memory 130 through the global bus 120 by using a decryption key which is pre-stored in the OTP memory 114. The RISC processor 112 authenticates OS images stored in the nonvolatile memory 130 by using a hash value included in an authentication program which is pre-stored in the OTP memory 114. The OTP memory 114 stores the decryption key for decrypting the encrypted confidential data and the authentication program and rejects external access.

The nonvolatile memory 130 stores the encrypted confidential data and the OS images, and the central processing unit 140 executes the OS images authenticated by the RISC processor 112.

Accordingly, the hash value and the decryption key are pre-generated and stored in the OTP memory 114, which increases a leakage probability.

In the case that the decryption key or the hash value is leaked, since the OTP memory 114 rejects external access, the decryption key or the hash value cannot be updated. As a result, the OS images cannot be modified or updated. When the contents of the OTP memory 114 are intended to be changed, a chip on which the OTP memory 114 is mounted or a system board must be replaced.

SUMMARY OF THE INVENTION

An aspect of the present invention is to provide a security method using a self-generated encryption key which can minimize leakage of confidential data by self-generating the encryption key for the confidential data, and a security apparatus using the same.

In order to achieve the above aspect of the present invention, and others, there is provided a security method including the steps of: generating an encryption key; decrypting pre-encrypted data by using a pre-stored manufacturer key; and re-encrypting the decrypted data by using the encryption key.

The security method further includes a step for checking an encryption key flag. When the encryption key flag is enabled, the encryption key is generated.

The encryption key flag may be a signal notifying whether the encryption key has been stored.

The security method further includes a step for checking a re-encryption flag. When the re-encryption flag is enabled, the decrypted data are re-encrypted by using the encryption key.

The re-encryption flag may be a signal notifying whether the data have been re-encrypted.

The pre-encrypted data may be confidential data.

The manufacturer key may be a key which has been used to encrypt the pre-encrypted data.

The encryption key may be generated by random number generation.

The re-encrypted data may be stored in a memory in which the pre-encrypted data have been stored.

In addition, there is provided a security apparatus including: an encryption key generating unit for generating an encryption key; an encrypting unit for decrypting pre-encrypted data and re-encrypting the decrypted data; and a security processor for controlling the encrypting unit to decrypt the pre-encrypted data by using a pre-stored manufacturer key and to re-encrypt the decrypted data by using the encryption key.

The security apparatus may further include: a first memory for storing the manufacturer key, an encryption key flag and a re-encryption flag; and a second memory for storing the pre-encrypted data.

The security processor may control the encryption key generating unit to generate the encryption key, when the encryption key flag is enabled.

For example, the encryption key flag is a signal notifying whether the encryption key has been stored.

The security processor may control the encrypting unit to re-encrypt the decrypted data by using the encryption key, when the re-encryption flag is enabled.

For instance, the re-encryption flag is a signal notifying whether the data have been re-encrypted.

The pre-encrypted data may be confidential data.

The manufacturer key may be a key which has been used to encrypt the pre-encrypted data.

The encryption key generating unit may generate the encryption key by random number generation.

The security processor may store the re-encrypted data in the second memory in which the pre-encrypted data have been stored.

There is also provided a security apparatus including: a first memory for storing a first booting code and a public key; a second memory for storing an encrypted second booting code and an OS program; a security processor for executing the first booting code, decrypting the encrypted second booting code by using the public key, and authenticating the decrypted second booting code; and a central processing unit for authenticating the OS program by using the second booting code and executing the OS program, when the second booting code has been successfully authenticated.

The security processor may calculate a hash value of the second booting code, compares the calculated hash value with a predefined hash value included in the decrypted second booting code, and authenticates the second booting code when the hash values are identical.

In addition, there is provided a security method including the steps of: executing a first booting code, decrypting an encrypted second booting code by using a pre-stored public key, and authenticating the decrypted second booting code; and when the second booting code has been successfully authenticated, authenticating an OS program by using the second booting code and executing the OS program.

The step for authenticating the second booting code may calculate a hash value of the second booting code, compares the calculated hash value with a predefined hash value included in the decrypted second booting code, and authenticates the second booting code when the hash values are identical.

BRIEF DESCRIPTION OF THE DRAWINGS

The aspects of the present invention will become more apparent by describing in detail exemplary embodiments thereof with reference to the attached drawing FIGS, in which.

DETAILED DESCRIPTION OF EXEMPLARY EMBODIMENTS OF THE PRESENT INVENTION

Figure 1:
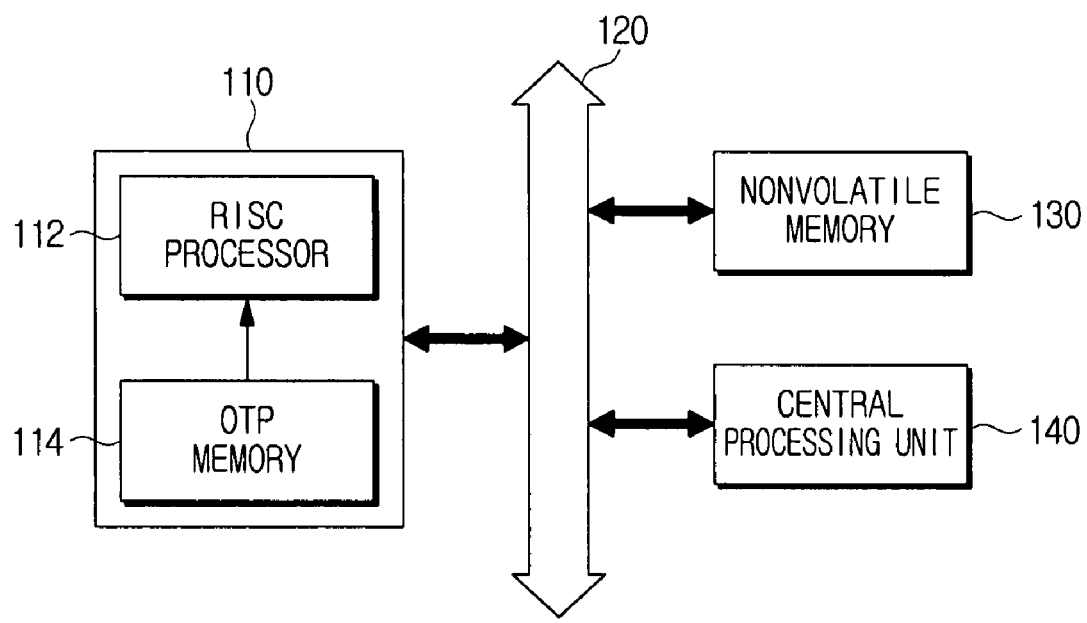
FIG. 1 is a block diagram illustrating a related art security apparatus.

Hereinafter, exemplary embodiments of the present invention will be described in detail with reference to the accompanying drawing figures.

In the following description, the same drawing reference numerals are used to reference the same elements, even in different drawings. The matters defined in the description, such as a detailed construction and elements, are nothing but examples provided to assist in a comprehensive understanding of the invention. Thus, it will be apparent to one of ordinary skill in the art that the present invention can be carried out without those defined matters. Also, well-known functions or constructions are not described in detail herein since they would obscure the invention in unnecessary detail.

Figure 2:
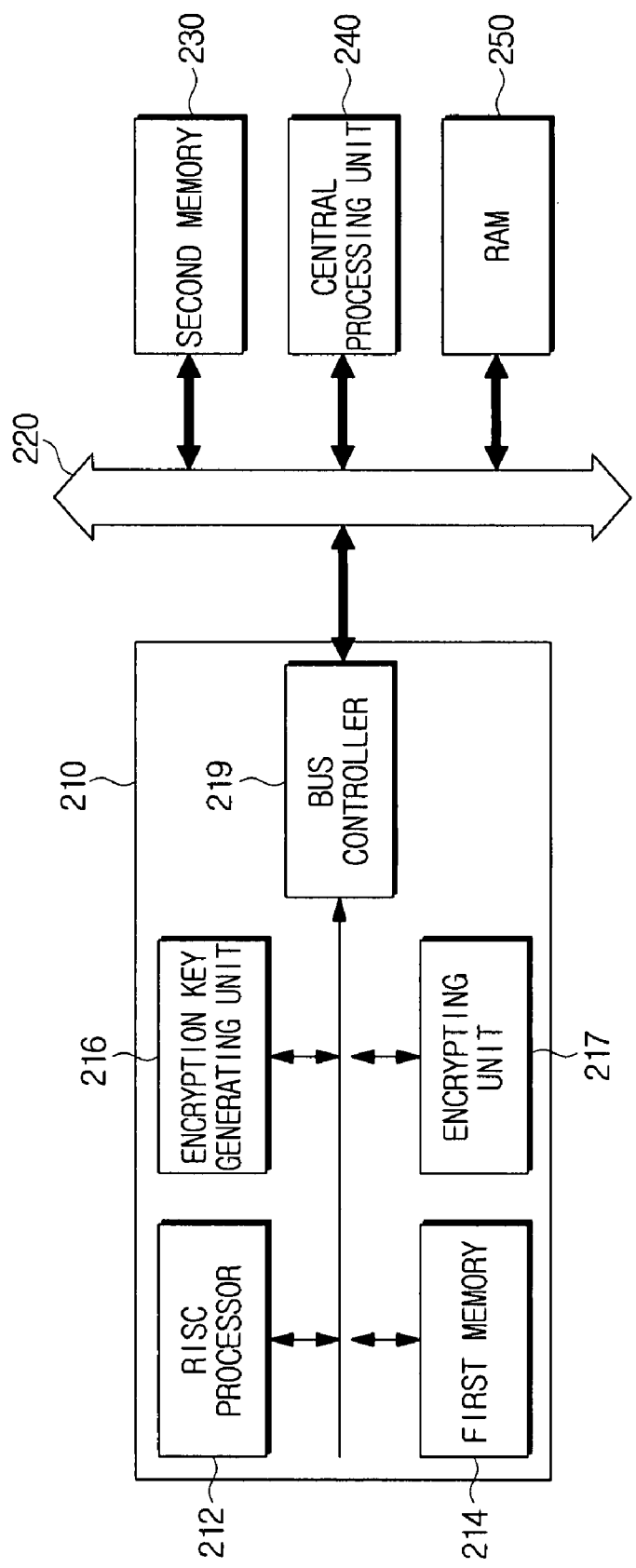
FIG. 2 is a block diagram illustrating a security apparatus in accordance with an exemplary embodiment of the present invention.

FIG. 2 is a block diagram illustrating the security apparatus in accordance with the exemplary embodiment of the present invention.

The security apparatus self-generates an encryption key for encrypting confidential data, and re-encrypts the confidential data by using the encryption key, thereby preventing leakage of the confidential data.

As illustrated in FIG. 2, the security apparatus includes a security unit 210, a global bus 220, a second memory 230, a central processing unit 240 and a random-access memory (RAM) 250.

The security unit 210 generates an encryption key for encrypting confidential data, and re-encrypts the confidential data by using the encryption key. The security unit 210 includes an RISC processor 212, a first memory 214, an encryption key generating unit 216, an encrypting unit 217 and a bus controller 219.

When the encryption key has not been stored in the first memory 214, the RISC processor 212 controls the encryption key generating unit 216 to generate the encryption key.

When the confidential data have not been re-encrypted, the RISC processor 212 controls the encrypting unit 217 to decrypt the encrypted confidential data by using a manufacturer key stored in the first memory 214. In addition, the RISC processor 212 controls the encrypting unit 217 to re-encrypt the decrypted confidential data by using the encryption key generated by the encryption key generating unit 216.

The first memory 214 is a nonvolatile memory, for example, a flash memory, and stores a first booting code for system booting, a public key and the manufacturer key. The first memory 214 also stores an encryption key flag, a re-encryption flag and the encryption key.

The encryption key generating unit 216 generates the encryption key by random number generation under the control of the RISC processor 212. The encrypting unit 217 re-encrypts the decrypted confidential data by using the encryption key generated by the encryption key generating unit 216 under the control of the RISC processor 212.

The bus controller 219 connects a local bus and the global bus 220 for communication. The second memory 230 is a nonvolatile memory, for example, a flash memory, and stores a second booting code for system booting, a program code and the encrypted confidential data.

After the confidential data stored in the second memory 230 are re-encrypted, the central processing unit 240 copies images stored in the second memory 230, namely, the second booting code, the program code and the encrypted confidential data to the RAM 250, authenticates the images, and executes the program only in the case of authentication success.

Figure 3:
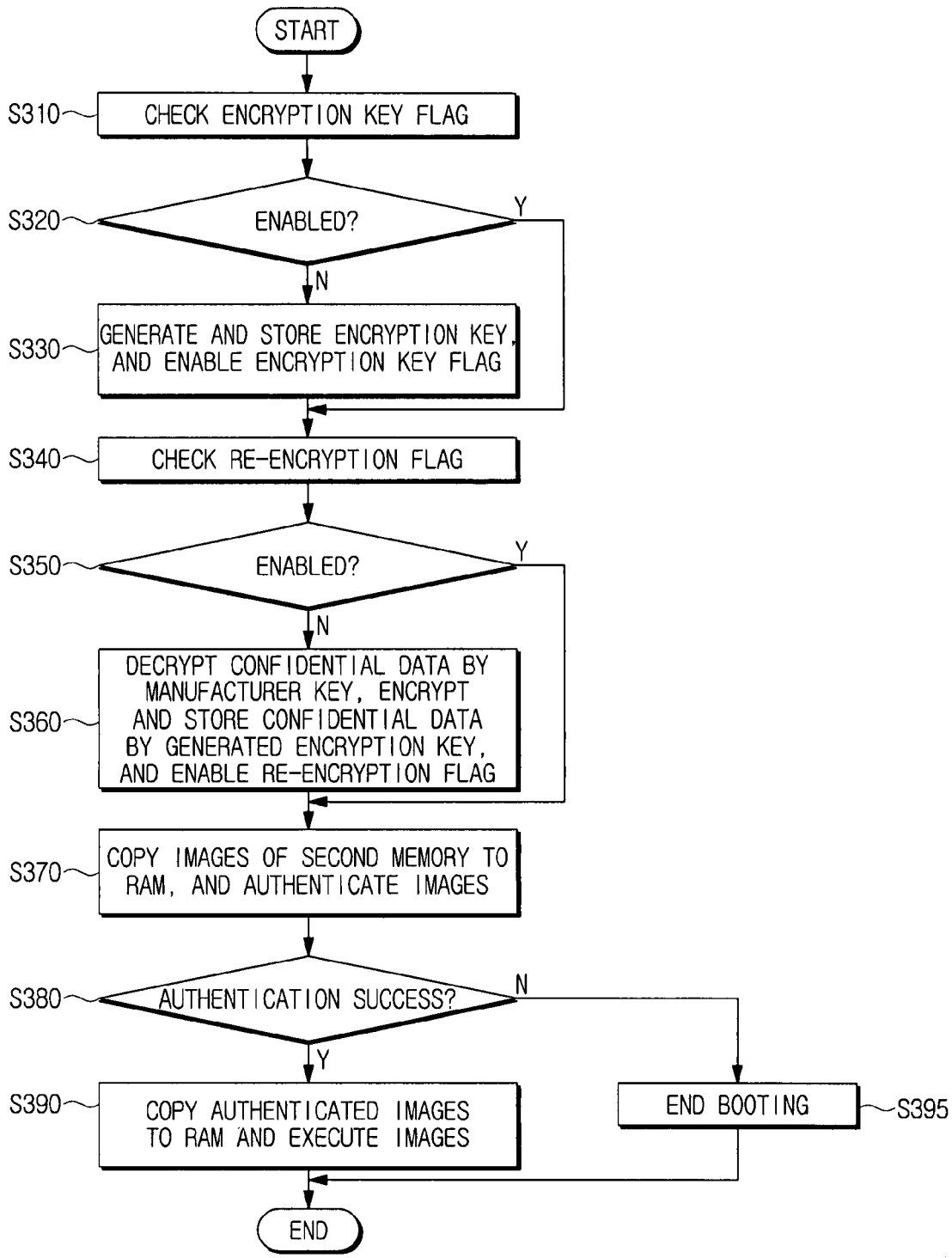
FIG. 3 is a flowchart showing sequential steps of a security method of a security apparatus in accordance with an exemplary embodiment of the present invention.

FIG. 3 is a flowchart showing sequential steps of the security method of a security apparatus in accordance with an exemplary embodiment of the present invention.

As shown in FIG. 3, the RISC processor 212 checks the encryption key flag of the first memory 214 by executing the first booting code stored in the first memory 214 (operation S310). The encryption key flag is a signal notifying whether the encryption key has been stored.

The RISC processor 212 determines whether the encryption key flag is enabled (operation S320). If the encryption key flag is enabled, this means that the encryption key has already been stored. If the encryption key flag is not enabled, this means that the encryption key has not been stored. In detail, when the encryption key flag has a value of '1', the RISC processor 212 determines that the encryption key flag is enabled, and when the encryption key flag has a value of '0', the RISC processor 212 determines that the encryption key flag is not enabled.

When the encryption key flag is not enabled (S320-N), the RISC processor 212 controls the encryption key generating unit 216 to generate the encryption key, stores the encryption key in the first memory 214, and enables the encryption key flag stored in the first memory 214 (operation S330). Here, the encryption key is a unique key self-generated by random number generation. Even among apparatuses manufactured by the same manufacturer, different sets have different encryption keys. That is, since the encryption keys are unique in each set, set binding is possible.

Thereafter, the RISC processor 212 checks the re-encryption flag stored in the first memory 214 (operation S340). In operation S320, when the encryption key flag is enabled (S320-Y), the RISC processor 212 directly checks the re-encryption flag without performing operation S330. The re-encryption flag is a signal whether the confidential data have been re-encrypted.

The RISC processor 212 determines whether the re-encryption flag is enabled (S350). If the re-encryption flag is enabled, it means that the confidential data have already been re-encrypted, and if the re-encryption flag is not enabled, it means that the confidential data have not been re-encrypted. In detail, when the re-encryption flag has a value of '1', the RISC processor 212 determines that the re-encryption flag is enabled, and when the re-encryption flag has a value of '0', the RISC processor 212 determines that the re-encryption flag is not enabled.

When the re-encryption flag is not enabled (S350-N), the RISC processor 212 controls the encrypting unit 217 to decrypt the confidential data stored in the second memory 230 by using the manufacturer key stored in the first memory 214 and to re-encrypt the decrypted confidential data by using the encryption key. In addition, the RISC processor 212 stores the re-encrypted confidential data in the second memory 230, through the bus controller 219 and the global bus 220, and enables the re-encryption flag stored in the first memory 214 (operation S360). Even if the manufacturer key is leaked, the confidential data can be re-encrypted by using the self-generated encryption key. As a result, the confidential data can be efficiently protected.

The above procedure from operation S310 to operation S360 is carried out at the first booting, and is not carried out from a subsequent booting because the encryption key flag and the re-encryption flag have already been enabled.

The central processing unit 240 copies the images of the second memory 230 to the RAM 250, and authenticates the second booting code, the program code and the encrypted confidential data (operation S370). In operation S350, when the re-encryption flag is enabled (S350-Y), the RISC processor 212 omits operation S360 and directly performs operation S370.

In detail, the RISC processor 212 checks integrity of the second booting code copied to the RAM 250 by using the first booting code stored in the first memory 214. The method for checking integrity compares a calculated hash value of the second booting code with a predefined hash value included in digital signature of the second booting code decrypted by using the public key stored in the first memory 214. In the related art, the predefined hash value of the second booting code is stored in the OTP memory, and thus easily leaked. In accordance with the present invention, the predefined hash value of the second booting code is included in the digital signature of the second booting code encrypted by using the public key, thereby reducing a probability of leakage and change.

If the calculated hash value is identical to the decrypted hash value, the RISC processor 212 finishes authentication of the second booting code, and if not, the RISC processor 212 ends booting. After the authentication of the second booting code, the central processing unit 240 executes the second booting code.

The central processing unit 240 checks integrity of the program code stored in the RAM 250 by using the second booting code according to the above-described method for checking integrity.

The encrypted confidential data are authenticated by the RISC processor 212. The RISC processor 212 decrypts the encrypted confidential data by using the encryption key stored in the first memory 214, and authenticates the decrypted confidential data.

The central processing unit 240 determines whether the images copied to the RAM 250 have been successfully authenticated (operation S380). When the images have been successfully authenticated (S380-Y), the central processing unit 240 copies the authenticated images to the RAM 250, and executes the images (operation S390). When the images have not been successfully authenticated (S380-N), the central processing unit 240 ends booting (operation S395).

As discussed earlier, a security method and apparatus consistent with the present invention minimize external leakage of the data by self-generating the unique encryption key. Since the encryption keys are unique in each set, set binding is possible. Moreover, even if the manufacturer key is leaked, since the confidential data are re-encrypted by using the self-generated encryption key, the leakage of the data is prevented.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A security method comprising:
    controlling, by a hardware processor, an encryption key generation unit to generate an encryption key;
    controlling, by the hardware processor, an encrypting unit to decrypt encrypted data using a stored manufacturer key; and
    controlling, by the hardware processor, the encrypting unit to re-encrypt the decrypted data using the encryption key,
    wherein the generating the encryption key, the decrypting the encrypted data, and the re-encrypting the decrypted data are only performed at a first booting and are not performed at subsequent bootings,
    wherein during the subsequent bootings, a first booting code instructs the hardware processor to check for an encryption key flag and if the encryption key flag indicates that the encryption key has been generated, then authenticates a second booting code using the first booting code.

2. The security method as claimed in claim 1, further comprising checking an encryption key flag,
    wherein, when the encryption key flag is enabled, the encryption key is generated.

3. The security method as claimed in claim 2, wherein the encryption key flag comprises a signal indicating that the encryption key has been stored.

4. The security method as claimed in claim 1, further comprising checking a re-encryption flag,
    wherein, when the re-encryption flag is enabled, the decrypted data are re-encrypted using the encryption key.

5. The security method as claimed in claim 4, wherein the re-encryption flag comprises a signal indicating that the decrypted data have been re-encrypted.

6. The security method as claimed in claim 1, wherein the encrypted data comprise confidential data.

7. The security method as claimed in claim 1, wherein the manufacturer key comprises a key which has been used to encrypt the encrypted data.

8. The security method as claimed in claim 1, wherein the encryption key is generated using random number generation.

9. The security method as claimed in claim 1, wherein the re-encrypted data are stored in a memory, and wherein the encrypted data is stored in said memory and/or the encrypted data was stored in said memory.

10. The security method as claimed in claim 1, wherein during the subsequent bootings, the encrypting unit decrypts the data using the encryption key instead of the stored manufacturer key.

11. A security apparatus comprising:
an encryption key generating unit which generates an encryption key at only a first booting and not at subsequent bootings;
an encrypting unit which decrypts encrypted data and which re-encrypts the decrypted data at only the first booting and not at the subsequent bootings; and
a security processor which, at only the first booting and not at the subsequent bootings, controls the encrypting unit to decrypt the encrypted data using a stored manufacturer key and to re-encrypt the decrypted data using the encryption key,
wherein during the subsequent bootings, a first booting code instructs the security apparatus to check for an encryption key flag and if the encryption key flag indicates that the encryption key has been generated, then authenticates a second booting code using the first booting code.

12. The security apparatus as claimed in claim 11, further comprising:
a first memory which stores the manufacturer key, an encryption key flag and a re-encryption flag; and
a second memory which stores the encrypted data.

13. The security apparatus as claimed in claim 12, wherein the security processor stores the re-encrypted data in the second memory.

14. The security apparatus as claimed in claim 11, wherein the security processor controls the encryption key generating unit to generate the encryption key, when an encryption key flag is enabled.

15. The security apparatus as claimed in claim 14, wherein the encryption key flag comprises a signal indicating that the encryption key has been stored.

16. The security apparatus as claimed in claim 11, wherein the security processor controls the encrypting unit to re-encrypt the decrypted data using the encryption key, when a re-encryption flag is enabled.

17. The security apparatus as claimed in claim 16, wherein the re-encryption flag comprises a signal indicating that the decrypted data have been re-encrypted.

18. The security apparatus as claimed in claim 11, wherein the encrypted data comprise confidential data.

19. The security apparatus as claimed in claim 11, wherein the manufacturer key comprises a key which has been used to encrypt the encrypted data.

20. The security apparatus as claimed in claim 11, wherein the encryption key generating unit generates the encryption key using random number generation.

21. A security apparatus comprising:
a first memory which stores a first booting code and a public key;
a second memory which stores an encrypted second booting code and an operating system (OS) program;
a security processor which executes the first booting code, decrypts the encrypted second booting code using the public key, and authenticates the decrypted second booting code; and
a central processing unit which authenticates the OS program using the second booting code and which executes the OS program when the second booting code has been authenticated,
wherein the first booting code is only executed at a first booting and is not executed at subsequent bootings,
wherein during the subsequent bootings, the first booting code instructs the security apparatus to check for an encryption key flag, and if the encryption key flag indicates that the encryption key has been generated, then authenticates the decrypted second booting code using the first booting code.

22. The security apparatus as claimed in claim 21, wherein the security processor calculates a hash value of the second booting code,
wherein the security processor compares the calculated hash value with a defined hash value, which is included in the decrypted second booting code, and
wherein the security processor authenticates the second booting code when the calculated hash value is identical to the defined hash value.

23. A security method comprising:
executing, by a first processor, a first booting code;
decrypting, by the first processor, an encrypted second booting code using a stored public key;
authenticating, by the first processor, the decrypted second booting code; and
if the decrypted second booting code has been authenticated, then authenticating, by a second processor, an operating system (OS) program using the second booting code and then executing, by the second processor, the OS program,
wherein the first booting code is only executed at a first booting and is not executed at subsequent bootings,
wherein during the subsequent bootings, the first booting code instructs the first processor to check for an encryption key flag, and if the encryption key flag indicates that the encryption key has been generated, then authenticates the decrypted second booting code using the first booting code.

24. The security method as claimed in claim 23, wherein authenticating the decrypted second booting code comprises:
calculating a hash value of the second booting code;
comparing the calculated hash value with a defined hash value, which is included in the decrypted second booting code; and
authenticating the second booting code when the calculated hash value is identical to the defined hash value.

* * * * *